US007032378B2

(12) United States Patent
Ioku et al.

(10) Patent No.: US 7,032,378 B2
(45) Date of Patent: Apr. 25, 2006

(54) FLOW DIVIDER SYSTEM AND VALVE DEVICE OF THE SAME

(75) Inventors: Kensuke Ioku, Hyogo-ken (JP); Jun Nakano, Hyogo-ken (JP)

(73) Assignee: Nabco Limited, Hyogo-ken (JP)

( * ) Notice: Subject to any disclaimer, the term of this patent is extended or adjusted under 35 U.S.C. 154(b) by 137 days.

(21) Appl. No.: 10/847,358

(22) Filed: May 18, 2004

(65) Prior Publication Data

US 2004/0250677 A1 Dec. 16, 2004

(30) Foreign Application Priority Data

Jun. 12, 2003 (JP) ............................ 2003-167286

(51) Int. Cl.
*F02B 11/00* (2006.01)
*F16K 27/00* (2006.01)

(52) U.S. Cl. .......................... 60/424; 91/515; 414/700

(58) Field of Classification Search .................. 91/514, 91/515; 60/424; 414/700
See application file for complete search history.

(56) References Cited

U.S. PATENT DOCUMENTS 3,563,137 A * 2/1971 Graber et al. ............... 414/700
3,980,000 A * 9/1976 Iijima et al. .................. 91/514
4,408,518 A 10/1983 Diel et al.
5,447,094 A 9/1995 Geyler, Jr.
5,669,282 A * 9/1997 Tanino et al. ............... 414/700
5,797,310 A 8/1998 Casey et al.
6,389,953 B1 * 5/2002 Altman et al. ................ 91/515

FOREIGN PATENT DOCUMENTS

JP 02-096028 4/1990
JP 07-252857 10/1995

* cited by examiner

*Primary Examiner*—Thomas E. Lazo
(74) *Attorney, Agent, or Firm*—Donald R. Studebaker; NixonPeabody, LLP

(57) ABSTRACT

There is provided a flow divider system in a hydraulic circuit for a work machine including a boom cylinder and a bucket cylinder. The flow divider system divides a pressured oil drained from a one-boom cylinder into an other-bucket cylinder and a tank via a first orifice, a second orifice and a flow dividing valve, maintaining a specified pressure difference between pressures downstream the first and second orifices. The first and second orifice are configured of a variable orifice respectively, and in the event that the oil flow from the one-boom chamber decreases, respective opening degrees of the first and second orifices are controlled so as to be reduced. Accordingly, changing of a divisional ratio of oil flow can be suppressed properly regardless of a small oil flow drained from the boom cylinder.

5 Claims, 10 Drawing Sheets

FLOW DIVIDER SYSTEM AND VALVE DEVICE OF THE SAME

BACKGROUND OF THE INVENTION

The present invention relates to a flow divider system used in a hydraulic circuit for a work machine including a boom cylinder and a bucket cylinder to divide a pressured oil drained from an one-boom chamber into a flow to an other-bucket chamber and a flow to a tank via an orifice and a flow diving valve.

Conventionally, it is known that there is provided a flow divider system used in a hydraulic circuit for a work machine including a boom cylinder and a bucket cylinder to divide a pressured oil drained from an one-boom chamber into a flow to an other-bucket chamber and a flow to a tank via an orifice and a flow dividing valve. See, for example, Japanese Patent Laid-Open Publication No. 10-219730 (page 4, FIGS. 1 and 2) (its corresponding U.S. Pat. No. 5,797,310), and Japanese Patent Laid-Open Publication No. 2-96028 (page 3, FIG. 1). A flow divider system disclosed in the former patent publication comprises a flow dividing valve 45 and orifices 75, 83. A flow divider system disclosed in the latter patent publication is comprised of a flow diving valve 18 including an orifice. The bucket-leveling function to maintain a bucket at a level position during a boom operation is materialized by these flow divider system supplying a return oil from the one-boom chamber to the other-bucket chamber.

In the flow divider system of the former patent publication, the orifice 75 is configured of a fixed orifice. Further, the orifice 83 comprising an opening 79 and a passage 81 is not configured either to be a variable orifice which can control its orifice degree automatically and adjustably during the operation of the flow divider system, even though it is structurally available for adjusting the orifice degree variably. As a result, this orifice functions just as a fixed orifice during the operation. Setting these fixed orifices 75, 83 at improperly reduced opening degrees may prevent an actuator from operating smoothly due to a restricted flow of pressured oil from a rod-side chamber of the boom cylinder. Accordingly, these fixed orifices need to be set at more proper opening degrees so as to provide such a smooth operation. Also, in the flow divider system of the latter patent publication, in which one is configured of a fixed orifice and the other is configured of a variable orifice, similar setting like the above may need to be applied to the fixed orifice as well.

Herein, there was a problem with such flow divider systems of the above-described patent publications that proper flow dividing may not be obtained in the event that the amount of oil drained from the rod-side chamber of the boom cylinder and flowing into the flow divider system becomes small enough under a certain condition which is different from a specified premise condition in setting the above preferable orifice opening degree. Namely, such small amount of pressured oil flowing could not provide a sufficient pressure raise at the upstream of the flow divider system, and thereby only small amount of oil may flow in a high-load side of diverged passage, while a large amount of oil may flow in a low-load side of diverged passage.

Herein, there are also other prior art disclosing similar flow divider system and a valve device of the same, such as Japanese Patent Laid-Open Publication No. 7-252857, U.S. Pat. Nos. 4,408,518 and 5,447,094.

SUMMARY OF THE INVENTION

The present invention has been devised in view of the above-described problem, and an object of the present invention is to provide a flow divider system and a valve device of the same which can suppress changing of a divisional ratio of divided oil flow amount regardless of whether the amount of oil flow drained from a boom cylinder is large or small.

The above-described object can be solved by the following present invention.

According to the present invention, there is provided a flow divider system used in a hydraulic circuit for a work machine including a boom cylinder for operating a boom and a bucket cylinder for operating a bucket, the boom cylinder having an one-boom chamber and an other-boom chamber operative in response to a pressured oil supplied into the chambers thereof, the bucket cylinder having an one-bucket chamber and an other-bucket chamber operative in response to a pressured oil supplied into the chambers thereof, the flow divider system comprising, a first passage disposed between the one-boom chamber and the other-bucket chamber and connecting with the one-boom chamber, a second passage connecting with the first passage and leading to the other-bucket chamber, a third passage connecting with the first passage and leading to a tank, a first orifice interposed between the first and second passages, a second orifice interposed between the first and third passages, and a flow dividing valve disposed downstream of the first and second orifices so as to maintain a specified pressure difference between a pressure downstream of the first orifice and a pressure downstream of the second orifice, wherein the pressured oil drained from the one-boom chamber is divided into a flow to the other-bucket chamber and a flow to a tank respectively via the first and second orifices and the flow dividing valve, and the first and second orifices are configured of variable orifices so as to reduce respective opening degrees of the first and second orifices when a flow amount of the pressured oil drained from the one-boom chamber decreases.

According to the above-described flow divider system, since respective opening degrees of the first and second orifices are reduced when the flow amount of the pressured oil drained from the one-boom chamber and flowing in the flow divider system decreases, the pressured oil can be properly prevented from flowing in a low-load side of either passage of the second and third passages even though the mount of the oil flow drained from the boom cylinder is small. Accordingly, there can be provided the flow divider system which can reduce changing of the divisional ratio of the divided oil flow amount regardless of whether the amount of oil flow drained from the boom cylinder is large or small.

According to the present invention, there is provided the flow divider system, wherein the respective opening degrees of the first and second orifices are controlled based on the pressures downstream of the first and second orifices.

Accordingly, decreasing of the amount of pressured oil flow drained from the one-boom chamber can be detected by the pressures downstream of the first and second orifices, thereby changing effectively opening degrees of the first and second orifices according to decreasing of the amount of the pressured oil drained from the one-boom chamber.

According to the present invention, there is provided the flow divider system, wherein there is provided an adjusting valve which is disposed between the first passage and the downstream of the first orifice.

Accordingly, the pressure difference between respective pressures downstream of the first and second orifices can be properly adjusted independently from the first and second orifices. Thereby, operating characteristics of the flow divider system for each product can be adjusted easily.

According to the present invention, there is provided a valve device of flow diver system used in the flow divider system, comprising a spool bore formed at a valve body, the first passage being open to the spool bore and connecting with the one-boom chamber, the second passage being open to the spool bore and connecting with the other-bucket chamber, the third passage being open to the spool bore and connecting with the tank, a spool slidably positioned in the spool bore, and first and second notches formed at the spool, wherein the first orifice is configured of the first notch and the spool bore, and the second orifice is configured of the second notch and the spool bore.

According to the above-described valve device, since the first and second orifices are formed by the use of a single valve body and a single spool, both opening degrees of the first and second orifices can be increased and decreased proportionally according to movement of the spool. Accordingly, the divisional ratio can be maintained constant easily, thereby suppressing changing of the divisional ratio properly.

According to the present invention, there is provided the valve device of flow divider system, wherein the flow dividing valve comprises a third notch formed at the spool which is located more closely to the second passage than the first notch, a fourth notch formed at the spool which is located more closely to the third passage than the second notch, a first pressure chamber formed at one end of the spool, a second pressure chamber formed at the other end of the spool, a first induction passage introducing a pressure downstream of the first notch into the first pressure chamber, and a second induction passage introducing a pressure downstream of the second notch into the second pressure chamber, and the first and second notches constitute an orifice so as to maintain the specified pressure difference between the pressure downstream of the first orifice and the pressure downstream of the second orifice.

According to the above-described valve device, since the first and second orifices and the flow dividing valve are formed by the use of a single valve body and a single spool, these orifices and the valve move and operate together. Accordingly, the opening degrees of the first and second orifices also decrease, along with the orifice whose opening degree formed by the third notch and the spool bore decreases to reduce the amount of oil flow in the second passage when the pressured oil flow drained from the one-boom chamber decreases. Thus, changing of the divisional ratio can be suppressed properly. Further, the first and second orifices and the flow dividing valve can be formed in a compact size compared with them formed separately.

DETAILED DESCRIPTION OF THE INVENTION

Hereinafter, preferred embodiments of the present invention will be described with reference to the accompanying drawings.

Embodiment 1

Figure 1:
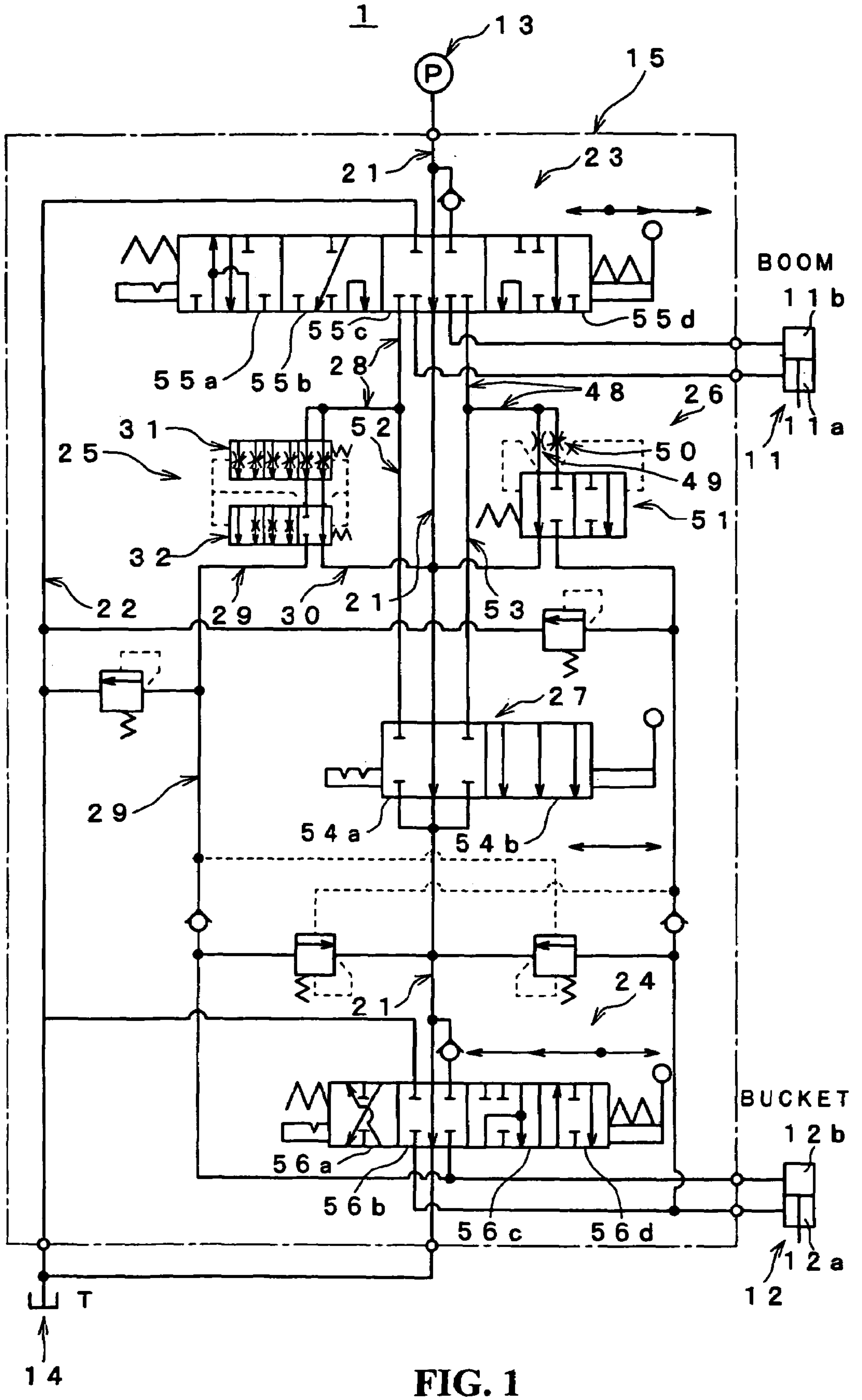
FIG. 1 is a diagram of an exemplified hydraulic circuit of a work machine equipped with a flow divider system according to a first embodiment of the present invention.

FIG. 1 is an exemplified hydraulic circuit of a work machine equipped with a flow divider system according to a first embodiment of the present invention. The hydraulic circuit 1 is used for a work machine like a loader (not illustrated) which comprises oil-pressure operating devices, such as a boom (which is, for example, attached to a front of a loader so as to be raised and lowered) and a bucket (which is, for example, attached to a front end of the boom).

The hydraulic circuit 1 comprises, as shown in FIG. 1, a boom cylinder 11, a bucket cylinder 12, a pump 13, a tank 14 and a multiple-directional switching valve 15. The boom cylinder 11 includes an one-boom chamber (rod-side chamber) 11*a* and an other-boom chamber (head-side chamber) 11*b*, and the boom (not illustrated) is operated by a pressured oil supplied into the one-boom chamber 11*a* and other-boom chamber 11*b*. Namely, the boom is lowered by the one-boom chamber 11*a* in which the pressured oil is supplied, while it is raised by the other-boom chamber 11*b* in which the pressured oil is supplied. The bucket cylinder 12 includes an one-bucket chamber (rod-side chamber) 12*a* and an other-bucket chamber (head-side chamber) 12*b*, and the bucket (not illustrated) is operated by a pressured oil supplied into the one-bucket chamber 12*a* and other-bucket chamber 12*b*. Namely, the bucket is curled by the one-bucket chamber 12*a* in which the pressured oil is supplied, while it is dumped by the other-bucket chamber 12*b* in which the pressured oil is supplied.

The multiple-directional switching valve 15 is connected with the boom cylinder 11, the bucket cylinder 12, the pump 13 and the tank 14, which includes an unloading passage 21, a tank passage 22, a directional switching valve for boom 23, a directional switching valve for bucket 24, flow divider systems 25, 26, a switching vale 27 and the like. The unloading passage 21 interconnects the pump 13 and the tank 14, and the directional switching valve for boom 23 and the directional switching valve for bucket 24 are connected in series. The tank passage 22 forms a connecting passage to the tank 14. The directional switching valve for boom 23 and the directional switching valve for bucket 24 control respectively the operations of the boom and the bucket by controlling a supply of the pressured oil from the pump 13 to the boom cylinder 11 and the bucket cylinder 12. The flow divider systems 25, 26 function to maintain the bucket at a level position during the boom operation by dividing a return pressured oil from the boom cylinder 11 into a flow to the tank 14 and a flow to the bucket cylinder 12. The switching valve 27 controls switching of operation and non-operation of the above-described function to maintain the bucket at the level position.

The first flow divider system 25 according to the first embodiment of the present invention comprises a first passage 28, a second passage 29, a third passage 30, an orifice 31 and a flow diving valve 32. The first passage 28 is disposed between the one-boom chamber 11*a* and the other-bucket chamber 12*b* and connects with the one-boom chamber 11*a* via the directional switching valve for boom 23. The second passage 29 connects with the first passage 28 via the orifice 31 and the flow dividing valve 32 and leads to the other-bucket chamber 12*b*. The third passage 30 connects with the first passage 28 via the orifice 31 and the flow dividing valve 32 and leads to the tank 14 via the unloading passage 21.

Figure 2:
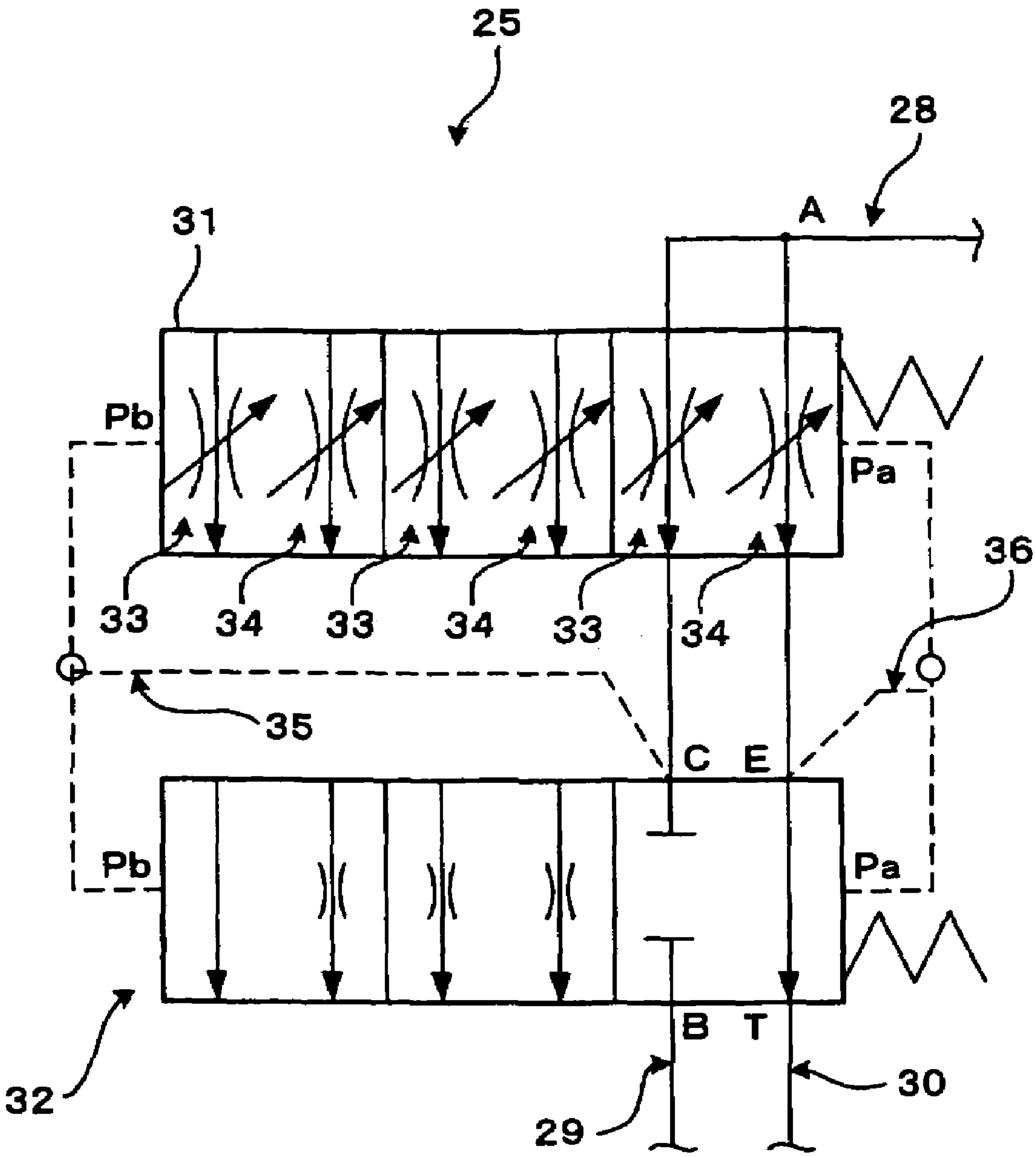
FIG. 2 is an enlarged view of the flow divider system of FIG. 1.

FIG. 2 shows an enlarged hydraulic circuit of the first flow divider system 25, and the orifice 31 includes a first orifice 33 and a second orifice 34. The first orifice 33 is a variable orifice, which is interposed between the first passage 28 and the second passage 29. The second orifice 34 is also a variable orifice, which is interposed between the first passage 28 and the third passage 30. The flow dividing valve 32 is disposed downstream of the first and second orifices 33, 34 so as to maintain a specified pressure difference between a pressure downstream of the first orifice 33 and a pressure downstream of the second orifice 34. When the directional switching valve for boom 23 is switched to a raise position 55*d* which will be described below and thereby the pressured oil drained from the one-boom chamber 11*a* flows in the first passage 28, the first flow divider system 25 divides the pressured oil flow into a flow to the second passage 29 (to the other-bucket chamber 12*b*) and a flow to the third passage 30 (to the tank 14) via the first and second orifices 33, 34 and the flow dividing valve 32.

The downstream of the first orifice 33 connects with a first introduction passage 35, and the downstream of the second orifice 34 connects with a second introduction passage 36. When the directional switching valve for boom 23 is switched to the raise position 55*d* and thereby the pressured oil drained from the one-boom chamber 11*a* flows in, the pressure downstream of the first and second orifices 33, 34 increases and the pressure in the first and second introduction passages 35, 36 also increases. Herein, the pressure downstream of the first and second orifices 33, 34 is so controlled by the flow dividing valve 32 as to provide a specified pressure difference between the pressure downstream of the first orifice 33 and the pressure downstream of the second orifice 34, and thereby the divisional ratio of divided oil flow amount into the second passage 29 and the third passage 30 can be maintained at a specified ratio. Accordingly, the flow dividing valve 32 can divide the oil flow properly so as to provide the specified flow amount ratio between the second passage 29 and the third passage 30 regardless of changing of the flow amount of the pressured oil drained from the one-boom chamber 11*a*.

Also, while the pressured oil drained from the one-boom chamber 11*a* flows in, the opening degrees of the first and second orifices 33, 34 are controlled based on the pressure downstream of the first and second orifices 33, 34 via the first and second introduction passages 35, 36. The opening degrees of the first and second orifices 33, 34 are increased with a large flow amount of the pressured oil from the one-boom chamber 11*a*, whereas they are decreased with a small amount of the pressured oil from the one-boom chamber 11*a*.

Figure 3:
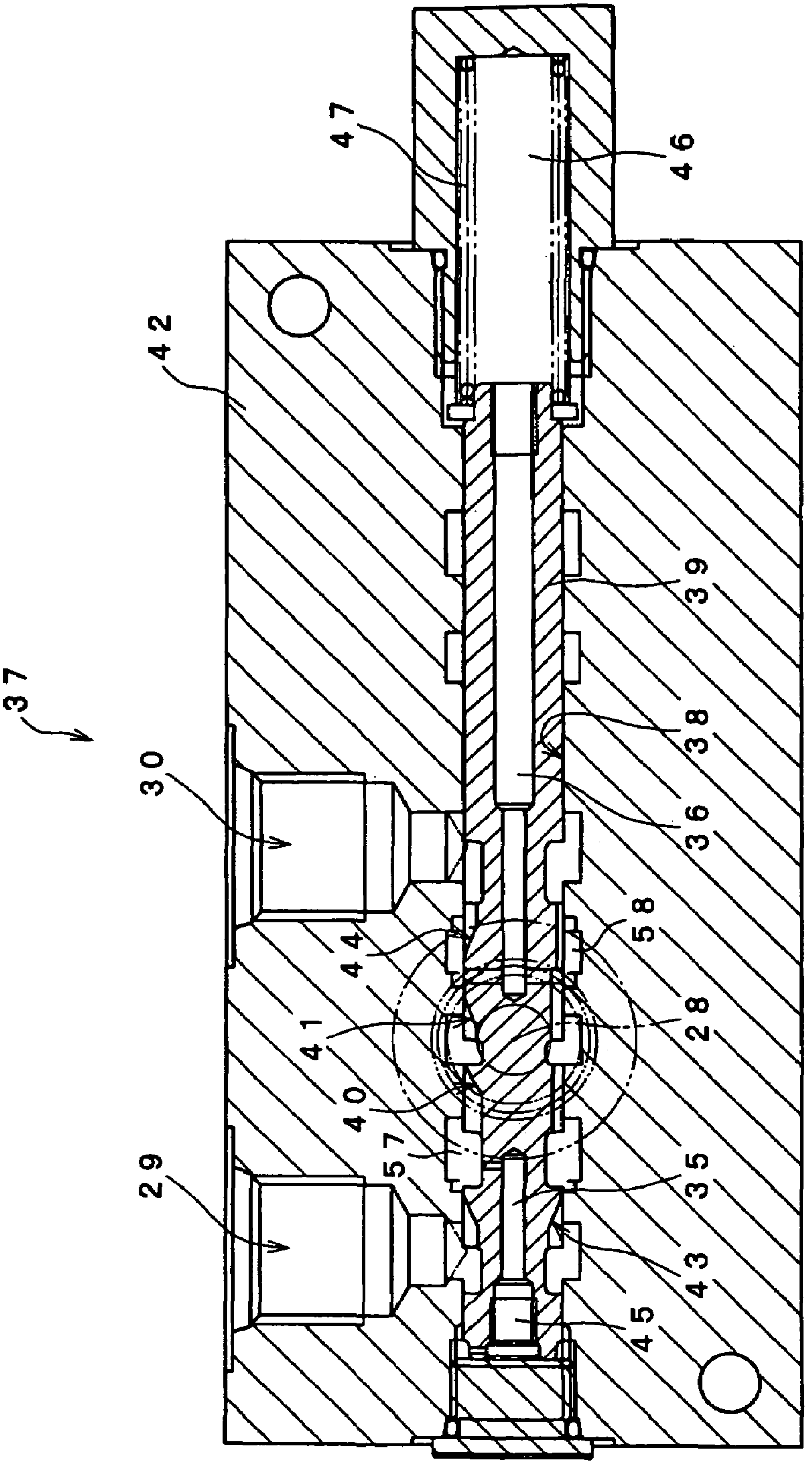
FIG. 3 is a sectional view of a valve device used in the flow divider system showed in FIG. 2.

FIG. 3 is a sectional view of a valve device 37 used for the first flow divider system 25. The valve device 37 includes a spool bore 38, the first passage 28, the second passage 29, the third passage 30, a spool 39, a first notch 40, a second notch 41 and the like. The spool bore 38 is formed as a substantially cylindrical hole in a valve body 42. The first passage 28 is open to the spool bore 38 and connects with the one-boom chamber 11*a*. The second passage 29 is open to the spool bore 38 and connects with the other-bucket chamber 12*b*. The third passage 30 is open to the spool bore 38 and connects with the tank 14. The spool 39 is formed in substantially cylindrical shape and is slidably positioned in the spool bore 38. The first and second notches 40, 41 are formed at the spool 39 in notch shape. Herein, the first orifice 33 is configured of the first notch 40 and the spool bore 38, and the second orifice 34 is configured of the second notch 41 and the spool bore 38.

Further, the flow divider valve 32 in the valve device 37 includes a third notch 43, a fourth notch 44, a first pressure chamber 45, a second pressure chamber 46, the first introduction passage 35, the second introduction passage 36 and the like. The third notch 43 is formed at the spool 39 which is located more closely to the second passage 29 than the first notch 40. The fourth notch 44 is formed at the spool 39 which is located more closely to the third passage 30 than the second notch 41. The first pressure chamber 45 is formed at one end of the spool 39, and the second pressure chamber 46 is formed at the other end of the spool 39. The first induction passage 35 is configured so as to introduce the pressure downstream of the first notch 40 into the first pressure chamber 45, and the second induction passage 36 is configured so as to introduce the pressure downstream of the second notch 41 into the second pressure chamber 46. Herein, connecting chambers 57, 58 are formed between the spool bore 38 and the spool 39. The pressure downstream of the first notch 40 is introduced into the first introduction passage 35 via the connecting chamber 57, whereas the pressure downstream of the second notch 41 is introduced into the second introduction passage 36 via the connecting chamber 58.

The flow dividing valve 32 is balanced by a total pressure of the oil pressure in the second pressure chamber 46 which is controlled by the orifice 31 constituted by the first and second notches 40, 41 and a spring pressure of a spring 47, and the oil pressure in the first pressure chamber 45. Accordingly, the position of the spool 39 in the spool bore 38 is adjusted so as to change the orifice opening degrees of the flow dividing valve 32 at the second passage 29 and the third passage 30. As a result, the pressures downstream of the first and second orifices 33, 34 can be maintained at a specified pressure difference.

Here, respective systems of the multiple-directional switching valve 15 shown in FIG. 1 will be described briefly. The second flow divider system 26 is provided downstream a merged passage 48 which is provided so as to connect with the other-boom chamber 11*b* at the multiple-directional switching valve 15. The second flow divider system 26 divides the pressured oil in the merged passage 48 into the flow to the one-bucket chamber 12*a* and the flow to the unloading passage 21 (i.e., the flow to the tank 14). The function to maintain the bucket at the level position during the boom lowering can be performed by supplying the pressured oil to the one-bucket chamber 12*a* via the second flow divider system 26. Further, the second flow divider system 26 is equipped with a fixed orifice 49, a variable orifice 50 and a flow dividing valve 51, and the flow dividing valve 51 adjusts pressures downstream of the orifices 49, 50 so as to maintain a specified pressure difference between them. Thus, the oil flow is divided such that the flow amount ratio of the flow to the one-bucket chamber 12*a* and the flow to the tank 14 can be maintained at a specified ratio.

Also, a diverged passage 52 and a diverged passage 53 are diverged respectively from the first passage 28 and the merged passage 48, and these connect with the unloading passage 21 via the switching valve 27. The switching valve 27 blocks the diverged passages 52, 53 in its levering-movement position 54*a*, while it connects the passages 52, 53 in its levering-cancellation position 54*b*.

The directional switching valve for boom 23 can take its four switching positions of a float position 55*a*, a lower position 55*b*, a neutral position 55*c* and a raise position 55*d*. In its raise position 55*d*, it allows the one-boom chamber 11*a* and the first passage 28 to be connected, so that the function to maintain the bucket at the level position during the boom raising is performed. In its lower position 55*b*, it allows the other-boom chamber 11*b* and the merged passage 48 to be connected, so that the function to maintain the bucket at the level position during the boom lowering is performed. Herein, such function to maintain the bucket at the level position is performed when the switching valve 27 is in its leveling-movement position 54*a*. Further, the directional switching valve for bucket 24 can take its four switching positions of a curl position 56*a*, a neutral position 56*b*, a high-dump position 56*c* and a dump position 56*d*.

Next, the operation of the first flow divider system 25 will be described. The first flow divider system 25 operates when, as described above, the directional switching valve for boom 23 is switched in its raise position 55*d* and the switching valve 27 is switched in its movement position 54*a*, so that the pressured oil from the first passage 28 is divided into the second passage 29 and the third passage 30. Then, in the event that the flow amount of the pressured oil from the one-boom chamber 11*a* decreases, the pressure of the pressured oil which is introduced from the first introduction passage 35 into the first pressure chamber 45 deceases and thereby the spool 39 moves in the spool bore 38 to decrease the opening degrees of the first and second orifices 33, 34.

Figure 4:
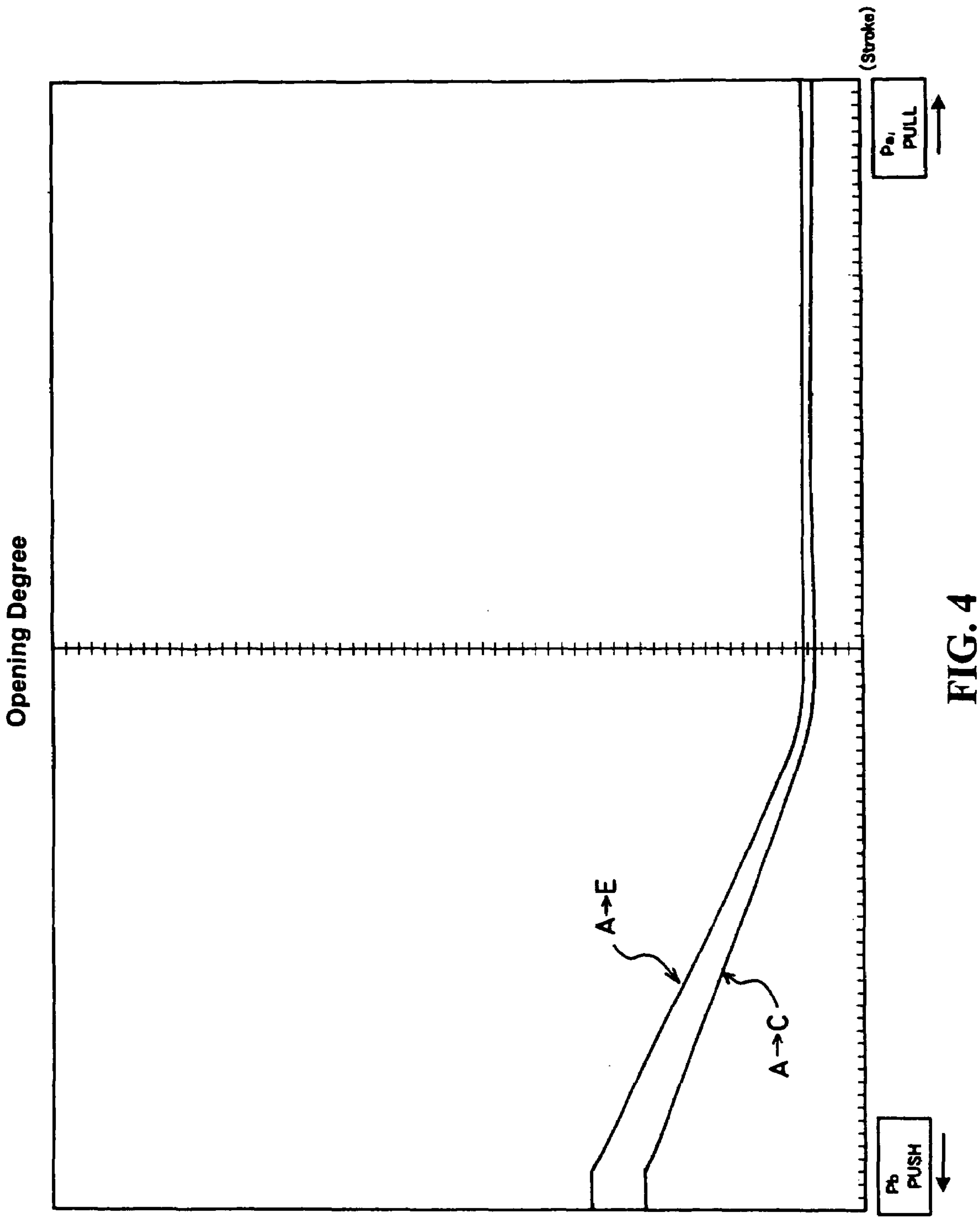
FIG. 4 is a graph showing changing of respective opening degrees of a first orifice and a second orifice with respect to changing of a stroke of a spool in the flow diver system showed in FIG. 2.

FIG. 4 shows changing of respective opening degrees (flow passage areas) of the first orifice 33 and the second orifice 34 with respect to changing of the stroke of the spool 39, and it shows changing of flow passage areas at A-C (the first orifice 33) and A-E (the second orifice 34) of FIG. 2. In the event that the flow amount of the pressured oil from the one-boom chamber 11*a* decreases and the pressure in the first introducing passage 35 deceases, the stroke of the spool 39 changes such that the spool 39 moves toward the first pressure chamber 45 (i.e., the stoke changes in such a direction that the pressure at a side of Pb in FIG. 2 decreases). Then, as shown in FIG. 4, the flow passage areas at A-C (the first orifice 33) and A-E (the second orifice 34) decrease together. Herein, the opening degrees of the first and second orifices 33, 34 decrease proportionally along with the movement of the spool 39, and thus the divisional ratio can be maintained at the constant ratio easily, thereby suppressing changing the divisional ratio properly.

Figure 5:
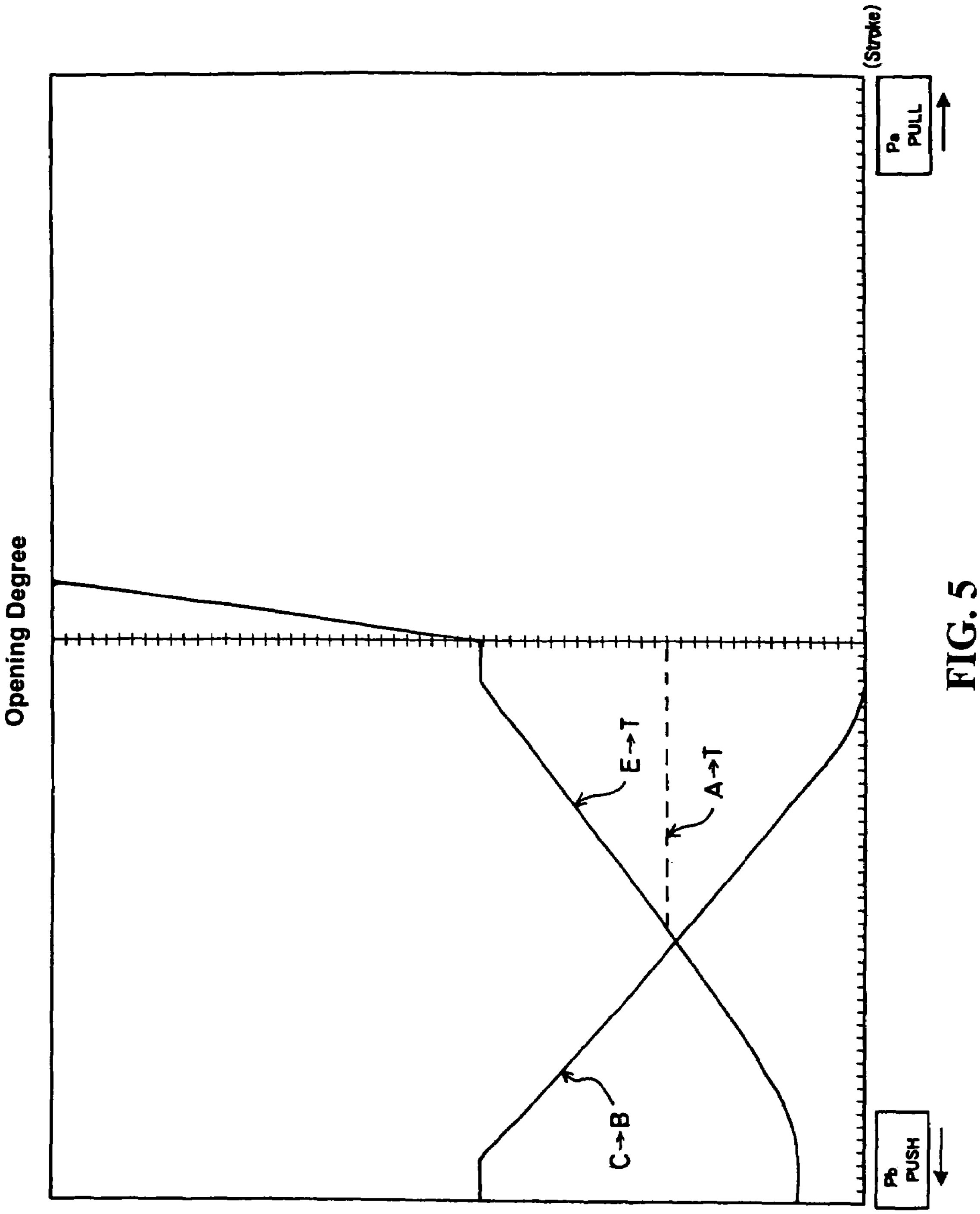
FIG. 5 is a graph showing changing of opening degrees of respective orifices of a flow dividing valve with respect to changing of the stroke of the spool in the flow diver system showed in FIG. 2.

Also, FIG. 5 shows changing of opening degrees (flow passage areas) of respective orifices of the flow dividing valve 32 with respect to changing of the stroke of the spool 39, and it shows changing of flow passage areas at C-B (in the second passage 29) and E-T (in the third passage 30) of FIG. 2. The orifice opening degrees at C-B and E-T change as shown in FIG. 5, along with movement of the spool 39 in response to pressure changing in the first pressure chamber 45 and the second pressure chamber 46. Accordingly, the pressures downstream of the first and second orifices 33, 34 is maintained at the specified pressure difference.

Figure 6:
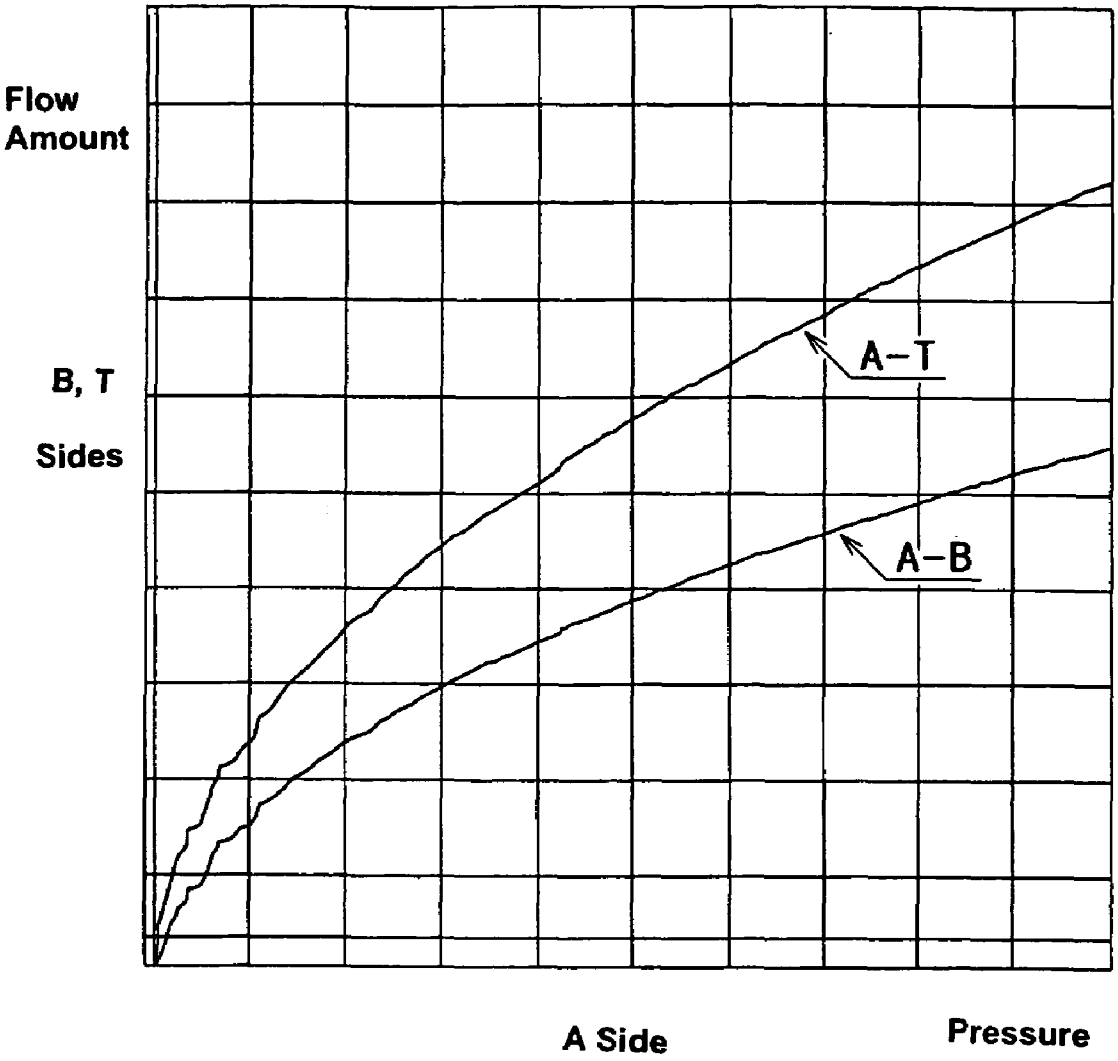
FIG. 6 is a graph showing results of a divided flow performed in the flow diver system showed in FIG. 2.

FIG. 6 is a graph showing results of the divided flow performed in the flow diver system 25 showed in FIG. 2, and it shows respective divided flow amount of pressured oil into the second passage 29 (B side) and the third passage 30 (T side) with respect to pressure changing (at the side of A in FIG. 2) of the pressured oil from the first passage 28. If, as the conventional structure, opening degrees of the first and second orifices 33, 34 are not reduced when the oil flow from the one-boom chamber 11*a* decreases and thereby the pressure at the side of A drops, more oil would flow in a low-load side of diverged passage B or T, resulting in great changing of the divisional ratio. In the first flow divider system 25, however, in the event that the pressure at the side of A drops, the opening degrees of the first and second orifices 33, 34 decrease in response to the pressure downstream of the first and second orifices 33, 34. Accordingly, as shown in FIG. 6, even in the event that the pressure at the side of A drops, both the flow amount of in the passage B (flow amount of A-B) and the flow amount in the passage T (flow amount of A-T) can be reduced with maintaining the specified divisional ratio therebetween until the time the pressure at the side of A drops to zero.

Figure 7:
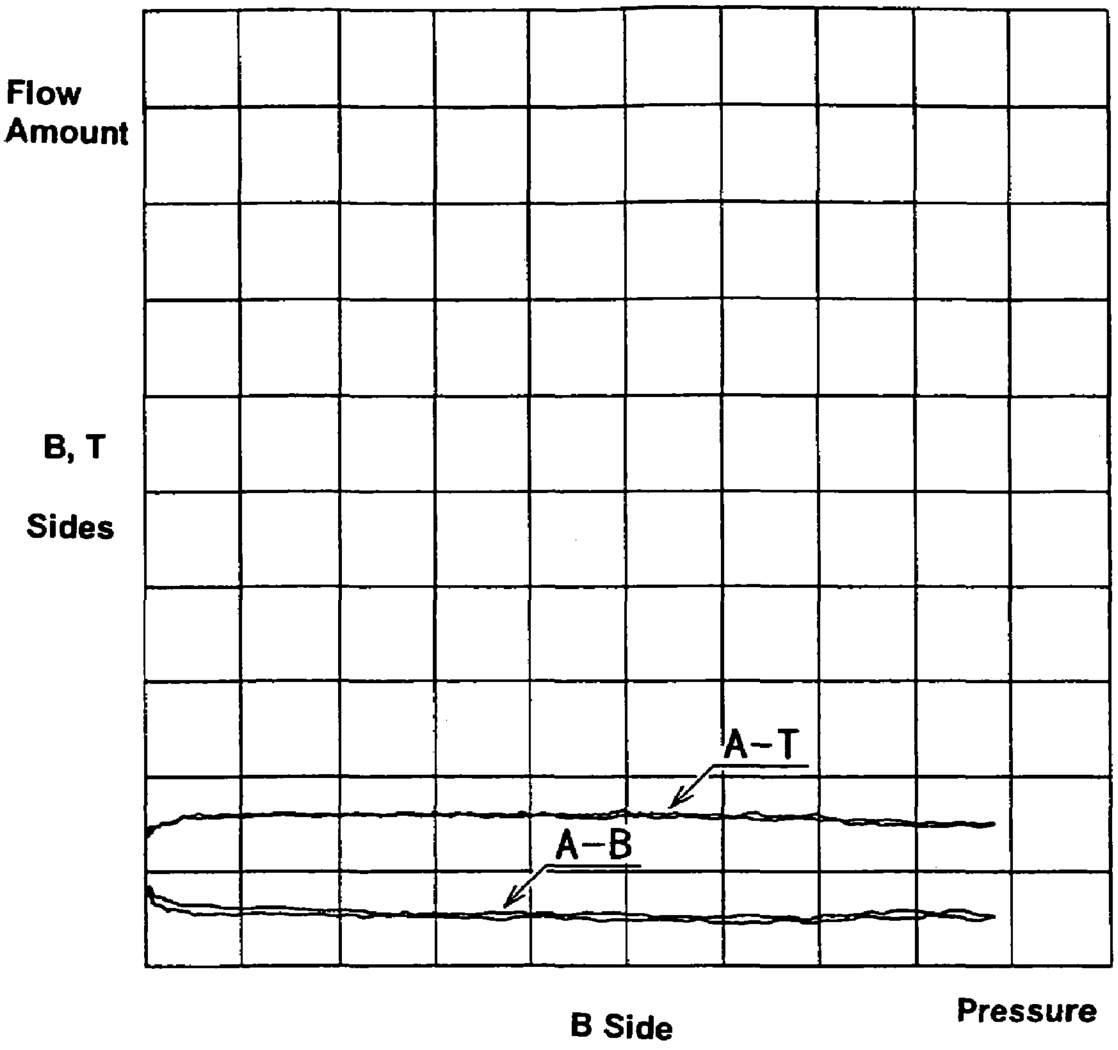
FIG. 7 is a graph showing results of a divided flow performed in the flow diver system showed in FIG. 2.

FIG. 7 is a graph showing results of the divided flow performed in the flow diver system 25, and it shows respective divided flow amounts of the passages B (flow amount of A-B) and T (flow amount of A-T) when the load of the bucket is changed and thereby the pressure in the passage B is changed. As shown in FIG. 7, even in the event that the load of the bucket changes and thereby the pressure in the passage B changes greatly, it is apparent that the both flow amounts in the passages B and T change hardly and thereby the divisional ratio changing of the divided flows is suppressed.

As described above, according to the first flow divider system 25, since respective opening degrees of the first and second orifices 33, 34 are reduced when the flow amount of the pressured oil drained from the one-boom chamber 11*a* decreases, the pressured oil can be properly prevented from flowing in the low-load side of either passage of the second and third passages 29, 30 even though the mount of the oil flow is small. Accordingly, there can be provided the flow divider system which can reduce changing of the divisional ratio of the divided oil flow amount regardless of whether the amount of oil flow drained from the boom cylinder is large or small. Herein, although the first flow divider system 25 is operative to control the orifice opening according to the pressure downstream of the first and second orifices 33, 34, controlling of the orifice opening according to the pressure upstream of them can also perform similar functions and effects to the above.

Embodiment 2

Figure 8:
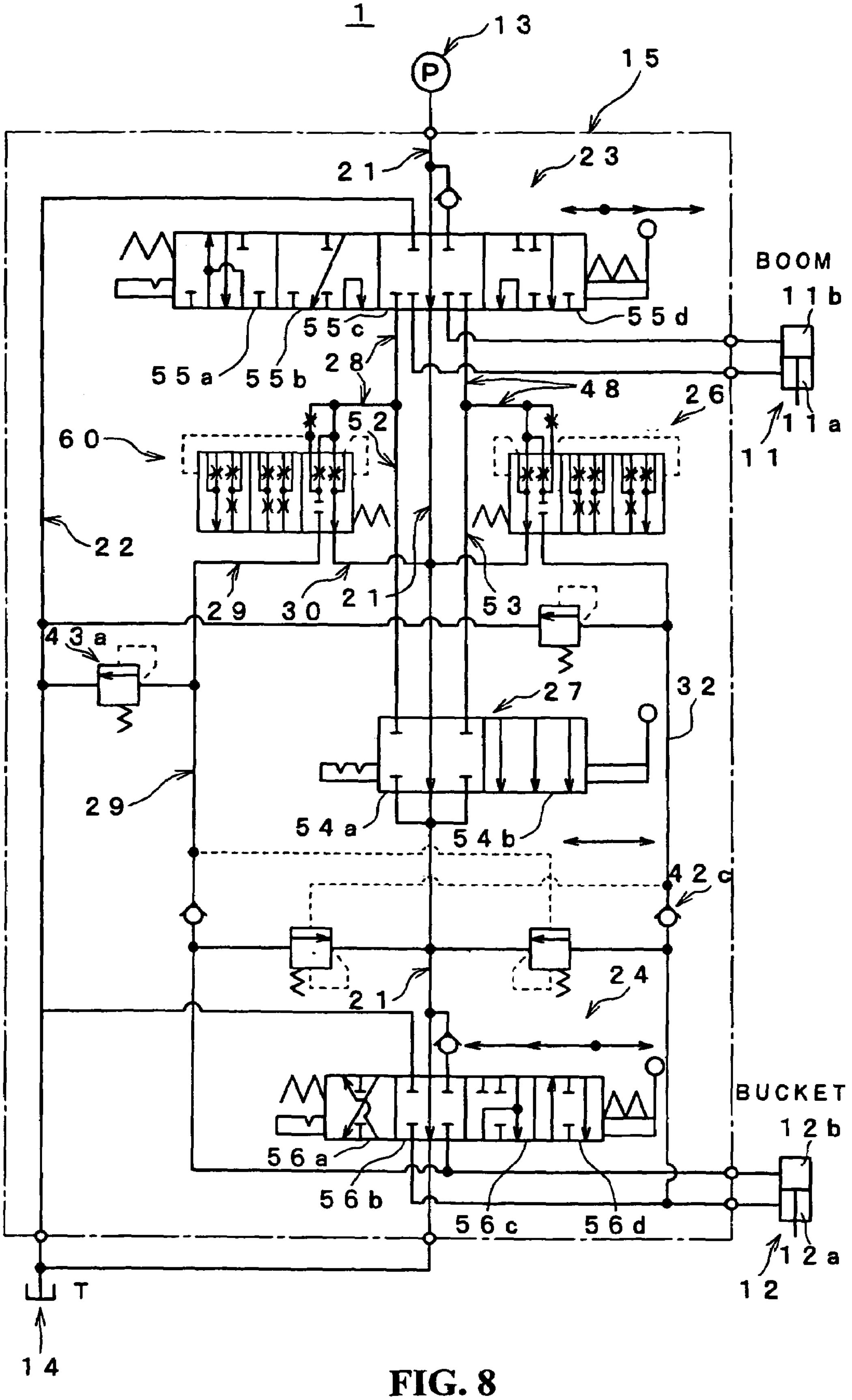
FIG. 8 is a diagram of an exemplified hydraulic circuit of a work machine equipped with a flow divider system according to a second embodiment of the present invention.
Figure 9:
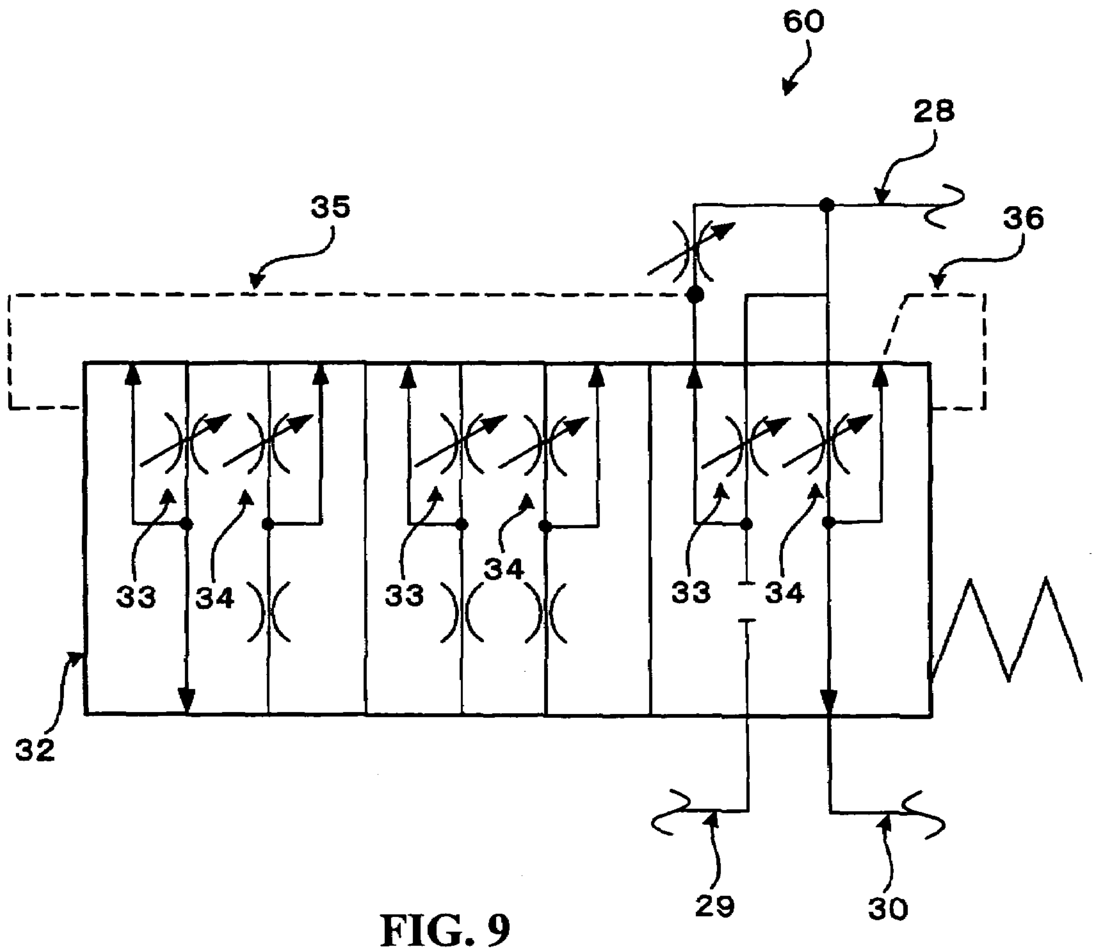
FIG. 9 is an enlarged view of the flow divider system of FIG. 8.

Next, a flow divider system according to a second embodiment of the present invention will be described. FIG. 8 is an exemplified hydraulic circuit in which a flow divider system 60 according to the second embodiment is used in the same hydraulic circuit 1 as that of the first embodiment of the present invention. FIG. 9 shows the enlarged flow divider system 60. The same parts and structures as the first embodiment are denoted by the same reference numerals in FIGS. 8 and 9.

Although the flow divider system 60 comprises the first, second and third passages 28, 29 and 30 and the flow dividing valve 32 like the flow divider system 25 of the first embodiment, the first and second orifices 33, 34 are formed integrally with the flow dividing valve 32. There are provided oil passages to introduce respectively pressures downstream of the first and second orifices 33, 34 into the first and second introduction passages 35, 36 at the flow dividing valve 32. The flow divider system 60 can also perform similar functions and effects to the flow divider system 25 of the first embodiment.

Embodiment 3

Figure 10:
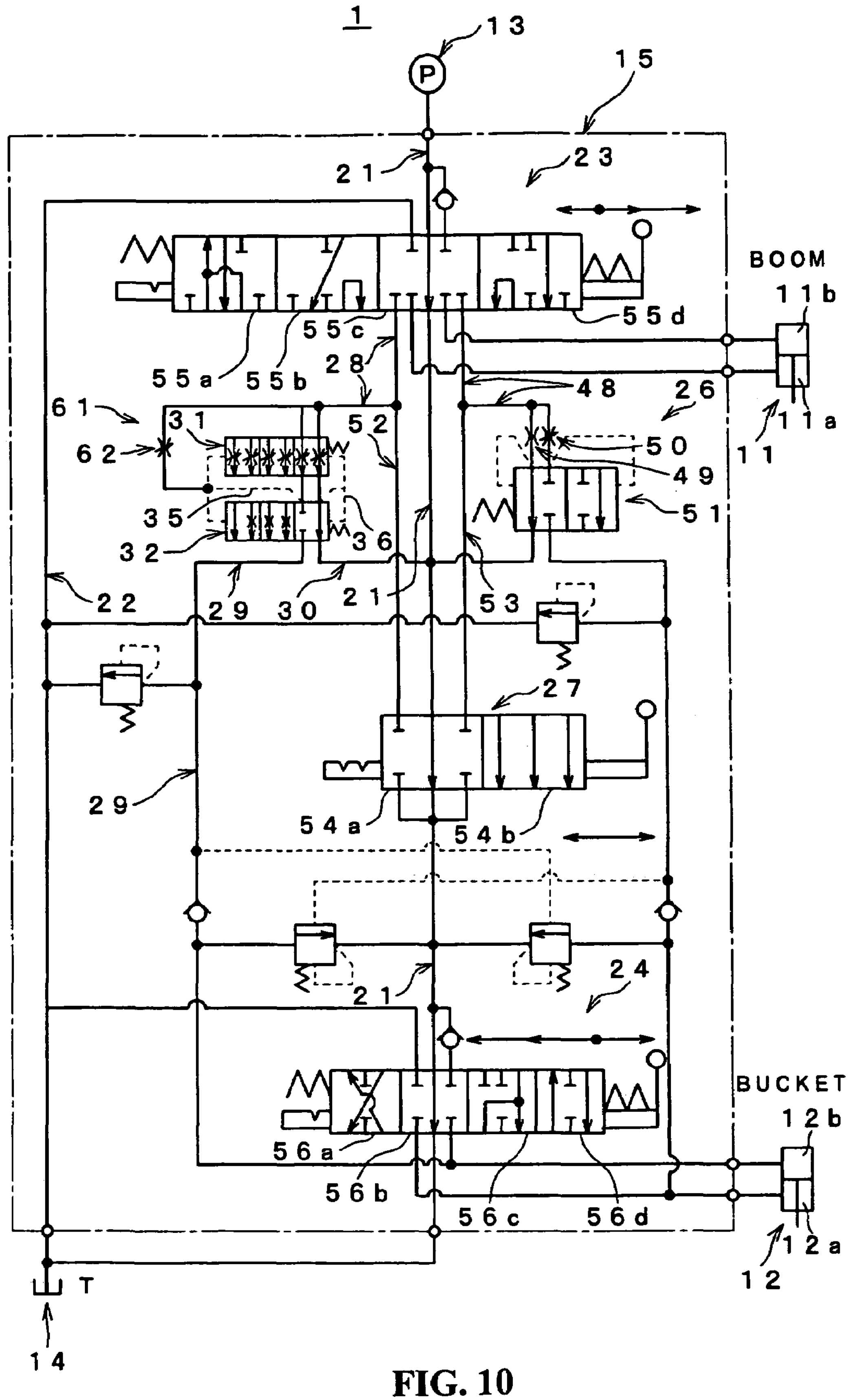
FIG. 10 is a diagram of an exemplified hydraulic circuit of a work machine equipped with a flow divider system according to a third embodiment of the present invention.

Next, a flow divider system according to a third embodiment of the present invention will be described. FIG. 10 is an exemplified hydraulic circuit in which a flow divider system 61 according to the third embodiment is used in the same hydraulic circuit 1 as that of the first embodiment of the present invention. Although the flow divider system 61 has the same structure as the flow divider system 25 of the first embodiment, there is further provided an adjusting valve 62 between the first passage 28 and the downstream of the first orifice. Namely, the first passage 28 and the first introduction passage 35 are connected, and the adjusting valve 62 is provided in the connecting passage. Accordingly, the pressure difference between the pressure downstream of the first orifice 33 and the pressure downstream of the second orifice 34 can be adjusted easily independently from the first and second orifices 33, 34.

Although some preferred embodiments are described above, the present invention should not limited to these embodiments. Any modifications can be adopted within the scope of the claimed invention. For example, the following modifications may be possible.

(1) Although the above-described exemplified hydraulic circuit is for the work machine, the present invention may be applied to various hydraulic circuits including the boom cylinder and the bucket cylinder.

(2) Although the above-described exemplified flow divider system performs maintaining the bucket at the level position during the boom raising, the present invention may be applied to the flow divider system to perform maintaining the bucket at the level position during the boom lowering. Further, the present invention may be applied to the flow divider system to perform maintaining the bucket at the level position during both the boom raising and boom lowering.

What is claimed is:

1. A flow divider system used in a hydraulic circuit for a work machine including a boom cylinder for operating a boom and a bucket cylinder for operating a bucket, the boom cylinder having one-boom chamber and an other-boom chamber operative in response to a pressured oil supplied into the chambers thereof, the bucket cylinder having one-bucket chamber and an other-bucket chamber operative in response to a pressured oil supplied into the chambers thereof, the flow divider system comprising;

a first passage disposed between said one-boom chamber and said other-bucket chamber and connecting with said one-boom chamber;

a second passage connecting with said first passage and leading to said other-bucket chamber;

a third passage connecting with said first passage and leading to a tank;

a first orifice interposed between said first and second passages;

a second orifice interposed between said first and third passages; and a flow dividing valve disposed downstream of said first and second orifices so as to maintain a specified pressure difference between a pressure downstream of said first orifice and a pressure downstream of said second orifice, wherein the pressured oil drained from said one-boom chamber is divided into a flow to said other-bucket chamber and a flow to a tank respectively via said first and second orifices and said flow dividing valve, and said first and second orifices are configured of variable orifices so as to reduce respective opening degrees of the first and second orifices when a flow amount of the pressured oil drained from said one-boom chamber decreases.

2. The flow divider system of claim 1, wherein said respective opening degrees of the first and second orifices are controlled based on said pressures downstream of the first and second orifices.

3. The flow divider system of claim 1, wherein there is provided an adjusting valve which is disposed between said first passage and the downstream of said first orifice.

4. A valve device of flow diver system used in said flow divider system of claim 1, comprising:

a spool bore formed at a valve body;

said first passage being open to said spool bore and connecting with said one-boom chamber;

said second passage being open to said spool bore and connecting with said other-bucket chamber;

said third passage being open to said spool bore and connecting with the tank;

a spool slidably positioned in said spool bore; and first and second notches formed at said spool, wherein said first orifice is configured of said first notch and said spool bore, and said second orifice is configured of said second notch and said spool bore.

5. The valve device of flow divider system of claim 4, wherein said flow dividing valve comprises a third notch formed at said spool which is located more closely to said second passage than said first notch, a fourth notch formed at said spool which is located more closely to said third passage than said second notch, a first pressure chamber formed at one end of said spool, a second pressure chamber formed at the other end of said spool, a first induction passage introducing a pressure downstream of said first notch into said first pressure chamber, and a second induction passage introducing a pressure downstream of said second notch into said second pressure chamber, and said first and second notches constitute an orifice so as to maintain said specified pressure difference between the pressure downstream of said first orifice and the pressure downstream of said second orifice.

* * * * *